US009299163B2

(12) United States Patent
Wu et al.

(10) Patent No.: US 9,299,163 B2
(45) Date of Patent: Mar. 29, 2016

(54) METHOD AND APPARATUS FOR PROCESSING EDGES OF A GRAY IMAGE

(71) Applicant: FUJITSU LIMITED, Kawasaki-shi, Kanagawa (JP)

(72) Inventors: Jianrong Wu, Beijing (CN); Xuan Fu, Beijing (CN); Akihiro Higashi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/290,169

(22) Filed: May 29, 2014

(65) Prior Publication Data
US 2014/0355877 A1 Dec. 4, 2014

(30) Foreign Application Priority Data
May 31, 2013 (CN) .......................... 2013 1 0211284

(51) Int. Cl.
*G06K 9/40* (2006.01)
*G06T 7/40* (2006.01)
*G06T 5/20* (2006.01)

(52) U.S. Cl.
CPC . *G06T 7/408* (2013.01); *G06T 5/20* (2013.01); *G06T 2207/10004* (2013.01); *G06T 2207/20021* (2013.01); *G06T 2207/20052* (2013.01)

(58) Field of Classification Search
None
See application file for complete search history.

(56) References Cited

U.S. PATENT DOCUMENTS

| 5,729,631 | A  | * | 3/1998 | Wober et al. | 382/232 |
| 7,590,302 | B1 | * | 9/2009 | Woodall | 382/266 |
| 2008/0085060 | A1 | * | 4/2008 | Bosco et al. | 382/264 |
| 2011/0050918 | A1 | * | 3/2011 | Tachi | 348/208.4 |

OTHER PUBLICATIONS

Extended European Search Report mailed Mar. 12, 2015 for corresponding European Patent Application No. 14170582.2.
O. Pogrebnyak et al., "Wiener discrete cosine transform-based image filtering," *Journal of Electronic Imaging*, vol. 21, No. 4, Oct.-Dec. 2012, 16 pages.
Anonymous, *Image Processing Toolbox User's Guide*, Mathworks, Mar. 2009, pp. 17-668-17-669.

* cited by examiner

*Primary Examiner* — Andrew Moyer
(74) *Attorney, Agent, or Firm* — Staas & Halsey LLP (57) ABSTRACT

A method and apparatus for processing a gray image, including: calculating a mean value and a standard difference of each edge pixel needing processing in an original gray image, and determining a predefined noise variance of each edge pixel according to the mean value and the standard difference; performing two-dimensional discrete cosine transform on an original gray image of a first adjacent area of each edge pixel; performing Wiener filtering on the two-dimensional discrete cosine transformed image data according to the noise variance; performing discrete cosine inverse transform on the two-dimensional Wiener filtered image data to obtain a filtered gray image of the first adjacent area; and extracting a filtered pixel value of each edge pixel from the filtered gray image of the first adjacent area, and obtaining a processed pixel value of each edge pixel by performing weighted summation on the filtered pixel value and an original pixel value.

12 Claims, 4 Drawing Sheets

METHOD AND APPARATUS FOR PROCESSING EDGES OF A GRAY IMAGE

This application claims the foreign priority benefit of Chinese Application No. 201310211284.4 filed on May 31, 2013, the contents of which are incorporated herein by reference.

TECHNICAL FIELD

The present invention relates to the field of image processing, and in particular to a method and apparatus for processing a gray image.

BACKGROUND ART

Currently, as the popularity and development of electronic devices, such as a digital camera, and a scanner, etc., digital images are so easy to be obtained. However, any entity sensors (such as a thermal sensor, electric sensor, or other types of sensors) are subjected to noise, which affects genuineness of signal measurement. Thus, any obtained image data contain signals and noise. Various applications related to images, such as medical image analysis, image segment, and object detection, etc., usually require an effective noise suppression method to further obtain a reliable result. Hence, image filtering has become one of most important and wide study subjects in image processing and computer vision. A gray image is one of important and widely-used image types, and its noise suppression method is crucial. However, existing filtering methods will make edges of an image look unnatural, and straight edges possibly look rough.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a method and apparatus for processing a gray image, which make edges of images more natural, and line edges of images more straight.

According to one aspect of the embodiments of the present invention, there is provided a method for processing a gray image, including: calculating a mean value and a standard difference of each of edge pixels needing to be processed in an original gray image, and determining a predefined noise variance of each of the edge pixels according to the mean value and the standard difference; performing two-dimensional discrete cosine transform on an original gray image of a first adjacent area of each of the edge pixels; performing two-dimensional Wiener filtering on the two-dimensional discrete cosine transformed image data according to the noise variance; performing two-dimensional discrete cosine inverse transform on the two-dimensional Wiener filtered image data, so as to obtain a filtered gray image of the first adjacent area; and extracting a filtered pixel value of each of the edge pixels from the filtered gray image of the first adjacent area, and performing weighted summation on the filtered pixel value of each of the edge pixels and an original pixel value of the edge pixel so as to obtain a processed pixel value of each of the edge pixels.

According to another aspect of the embodiments of the present invention, there is provided an apparatus for processing a gray image, including: a calculating unit configured to calculate a mean value and a standard difference of each of edge pixels needing to be processed in an original gray image; a noise variance determining unit configured to determine a predefined noise variance of each of the edge pixels according to the mean value and the standard difference; a two-dimensional discrete cosine transforming unit configured to perform two-dimensional discrete cosine transform on an original gray image of a first adjacent area of each of the edge pixels; a filtering unit configured to perform two-dimensional Wiener filtering on the two-dimensional discrete cosine transformed image data according to the noise variance; a two-dimensional discrete cosine inverse transforming unit configured to perform two-dimensional discrete cosine inverse transform on the two-dimensional Wiener filtered image data, so as to obtain a filtered gray image of the first adjacent area; and a weighted summing unit configured to extract a filtered pixel value of each of the edge pixels from the filtered gray image of the first adjacent area, and perform weighted summation on the filtered pixel value of each of the edge pixels and an original pixel value of the edge pixel so as to obtain a processed pixel value of each of the edge pixels.

The advantage of the embodiments of the present invention resides in that edges of images are more natural, and line edges of images are more straight.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION OF THE INVENTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Currently, existing filtering methods will make edges of an image look unnatural, and straight edges possibly look rough. In the implementation of the present invention, the inventors found that edges of an image may be made look natural by using a method for detecting edge pixels and performing smoothing processing.

Existing methods for detection of edge pixels are, for example, Sobel method, Prewitt method, and Gradient method, etc. Wherein, the Sobel method detects edge pixels based on intensity differences of adjacent pixels in a horizontal direction and a vertical direction. Wherein, a difference between weighted values of edge pixels is much greater than a difference between weighted values of other pixels. However, such a detection result is not accurate, and a scope of the detection result is too small, for example, it is only of a pixel width;

the Prewitt method detects edge pixels based on intensity differences of adjacent pixels in a horizontal direction and a vertical direction. Wherein, intensity differences of edge pixels are much greater than intensity differences of other pixels. However, the same defect as that in the Sobel method exists also in this method;

and the Gradient method detects edge pixels based on a gradient intensity value; wherein, an intensity value of edge pixels is much greater than an intensity value of other pixels; however, such a method is too sensitive to image noise.

Existing methods for smoothing processing are, for example, Gaussian filter method, Non-local means method, and Median filter method, etc. Wherein, the Gaussian filter method uses Gaussian filtering to smooth an image, which is relatively small in an amount of calculation and relatively high in efficiency; however, such a method makes the image blurry and unnatural;

the Non-local means method uses non-local means filtering to smooth an image, with a filtering result being more natural than that of the Gaussian filter method; however, concavo-convex feeling of edges is not efficiently suppressed in such a method;

and the Median filter method is similar to the Gaussian filter method, with an exception that in intensity of a current pixel is replaced with a median value of an adjacent area in this method. However, the same defect as that in the Gaussian filter method exists also in this method.

Therefore, existing methods cannot make an edge of an image natural and line edges of an image straight.

The method and apparatus for processing a gray image shall be described below with reference to the accompanying drawings.

Embodiment 1

Figure 1:
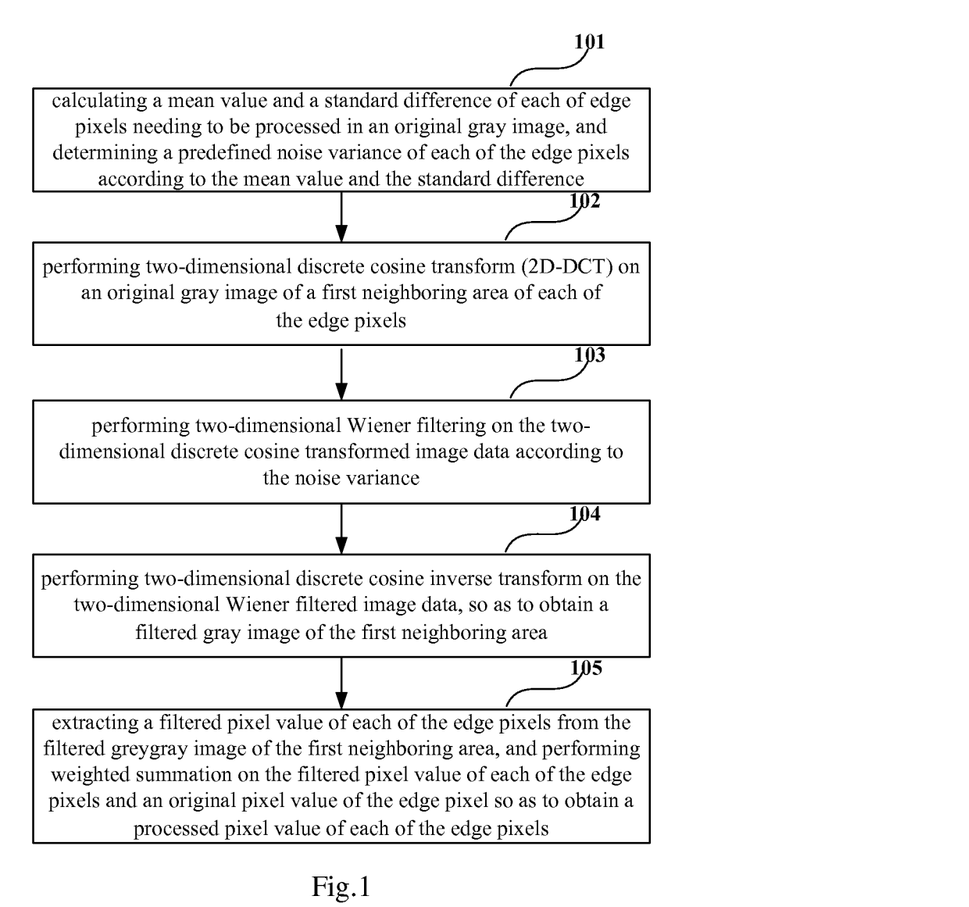
FIG. 1 is a flowchart of the method for processing a gray image of Embodiment 1 of the present invention.

FIG. 1 is a flowchart of the method for processing a gray image of Embodiment 1 of the present invention. As shown in FIG. 1, the method includes:

step 101: calculating a mean value and a standard difference of each of edge pixels needing to be processed in an original gray image, and determining a predefined noise variance of each of the edge pixels according to the mean value and the standard difference;

step 102: performing two-dimensional discrete cosine transform (2D-DCT) on an original gray image of a first adjacent area of each of the edge pixels;

step 103: performing two-dimensional Wiener filtering on the two-dimensional discrete cosine transformed image data according to the noise variance;

step 104: performing two-dimensional discrete cosine inverse transform on the two-dimensional Wiener filtered image data, so as to obtain a filtered gray image of the first adjacent area; and step 105: extracting a filtered pixel value of each of the edge pixels from the filtered gray image of the first adjacent area, and performing weighted summation on the filtered pixel value of each of the edge pixels and an original pixel value of the edge pixel so as to obtain a processed pixel value of each of the edge pixels.

It can be seen from the above embodiment that the noise variance is determined according to the mean value and the standard difference of an edge pixel, and two-dimensional Wiener filtering is performed based on the noise variance in a 2D-DCT domain, so that edges of an image are made more natural, and line edges of an image are made more straight.

In step 101, any method of the prior art may be employed for determining edge pixels needing to be processed. In the present invention, for example, a difference and a standard difference of a pixel in the original gray image may be compared respectively with a first predefined threshold value and a second predefined threshold value. If the difference of the pixel is greater than the first predefined threshold value and the standard difference of the pixel is greater than the second predefined threshold value, the pixel is taken as an edge pixel needing to be processed.

Wherein, any method of the prior art may be employed for calculating a difference of a pixel. In the present invention, a difference of a pixel (i, j) may be calculated by using formula (1) below:

$$\text{diff}(i,j) = \max(|x(i,j) - x(k,m)|), k \in [i-Rd, i+Rd], m \in [j-Rd, j+Rd] \quad (1)$$

where, diff(i,j) denotes a difference of a pixel (i,j), x(i,j) denotes a pixel value of the pixel (i,j), x(k,m) denotes a pixel value of a pixel (k,m), the pixel (k,m) being a pixel of a second adjacent area of the pixel (i,j), Rd denotes a radius of the second adjacent area, i and k are integers from 1 to A, and j and m are integers from 1 to B, A and B being a number of rows and a number of columns of pixels of an original gray image, respectively.

For example, for a pixel (2,2), it may be taken that Rd=1. Then, the second adjacent area may be expressed as:

$$\begin{Bmatrix} x_{1,1} & x_{1,2} & x_{1,3} \\ x_{2,1} & x_{2,2} & x_{2,3} \\ x_{3,1} & x_{3,2} & x_{3,3} \end{Bmatrix};$$

at this moment, a difference of pixel (2,2) may be calculated by using formula (2) below:

$$\text{diff}_{ex} = \max(|x(2,2) - x(k,m)|) k, m = 1, 2, 3 \quad (2)$$

where, $\text{diff}_{ex}$ denotes the difference of pixel (2,2), x(2,2) denotes a pixel value of pixel (2,2), and x(k,m) denotes a pixel value of a pixel (k,m), the pixel (k,m) being a pixel within the second adjacent area of pixel (2,2).

In this embodiment, any method of the prior art may be employed for calculating a mean value and a standard difference of a pixel. In the present invention, a mean value and a standard difference of the pixel (i,j) may be calculated by using formulae (3) and (4) below:

$$\text{mean}(i, j) = \frac{\sum_{k=i-Rsm}^{i+Rsm} \sum_{m=j-Rsm}^{j+Rsm} x(k, m)}{(2 \times Rsm + 1)^2}, \quad (3)$$

$$k \in [i - Rsm, i + Rsm],$$
$$m \in [j - Rsm, j + Rsm]$$

$$std(i, j) = \sqrt{\frac{1}{(2 \times Rsm + 1)^2} \sum_{k=i-Rsm}^{i+Rsm} \sum_{m=j-Rsm}^{j+Rsm} (x(k, m) - \text{mean}(i, j))^2} \quad (4)$$

where, mean(i,j) denotes a mean value of the pixel (i,j), std (i,j) denotes a standard difference of the pixel (i,j), x(k,m) denotes a pixel value of a pixel (k,m), the pixel (k,m) being a pixel within the third adjacent area of the pixel (i,j), Rsm denoting a radius of the third adjacent area, Rsm being an integer greater than 1, i and k are integers from 1 to A, and j and m are integers from 1 to B, A and B being a number of rows and a number of columns of the pixels of the original gray image, respectively.

For example, for a pixel (5,5), it may be taken that Rsm=4. Then, the third adjacent area may be expressed as:

$$\begin{Bmatrix} x_{1,1} & x_{1,2} & \ldots & \ldots & x_{1,9} \\ x_{2,1} & x_{2,2} & \ldots & \ldots & x_{2,9} \\ \vdots & \ldots & x_{5,5} & \ldots & \vdots \\ \vdots & \ddots & \ddots & \ddots & \vdots \\ x_{9,1} & \ldots & \ldots & \ldots & x_{9,9} \end{Bmatrix};$$

at this moment, a mean value and standard difference of pixel (5,5) may be calculated by using formulae (5) and (6) below:

$$\text{mean}_{ex} = \frac{\sum_{k=1}^{9} \sum_{m=1}^{9} x(k, m)}{(2 \times 4 + 1)^2} \quad (5)$$

$$std_{ex} = \sqrt{\frac{1}{(2 \times 4 + 1)^2} \sum_{k=1}^{9} \sum_{m=1}^{9} (x(k, m) - \text{mean}_{ex})^2} \quad (6)$$

where, $\text{mean}_{ex}$ denotes the mean value of pixel (5,5), $std_{ex}$ denotes the standard difference of pixel (5,5), x(k,m) denotes a pixel value of a pixel (k,m), the pixel (k, m) being a pixel within the third adjacent area of pixel (5,5).

In this way, the difference, mean value and standard difference of the pixel (i,j) may be calculated by using the method above.

In this embodiment, the first threshold value and the second threshold value may be predefined according to an actual situation. When the difference of the pixel (i,j) is greater than the first threshold value and the standard difference of the pixel (i,j) is greater than the second threshold value, the pixel (i,j) is determined as an edge pixel, which needs to be processed. Wherein, a numerical value less than 25, for example, may be selected as the first threshold value according to an actual situation, and a numerical value between 10 and 30, for example, may be selected as the second threshold value according to an actual situation.

Figure 2:
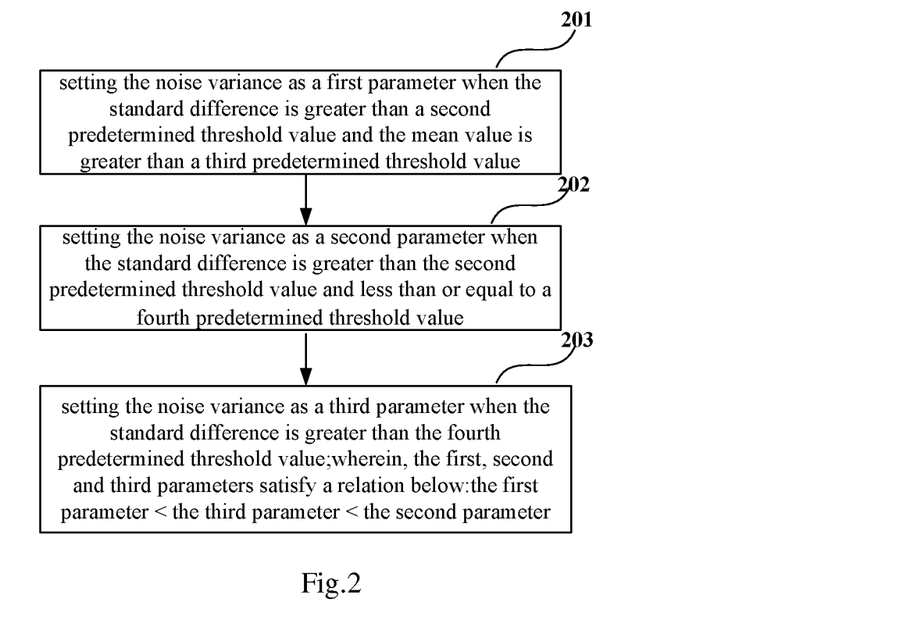
FIG. 2 is a flowchart of the method for determining a noise variance according to a mean value and a standard difference of edge pixels of Embodiment 1 of the present invention.

In this embodiment, the noise variance of an edge pixel may be determined according to the mean value and the standard difference of the edge pixel as actually demanded. FIG. 2 is a flowchart of the method for determining a noise variance according to a mean value and a standard difference of edge pixels of this embodiment. As shown in FIG. 2, the method includes:

step 201: setting the noise variance as a first parameter when the standard difference is greater than a second predetermined threshold value and the mean value is greater than a third predetermined threshold value;

step 202: setting the noise variance as a second parameter when the standard difference is greater than the second predetermined threshold value and less than or equal to a fourth predetermined threshold value; and step 203: setting the noise variance as a third parameter when the standard difference is greater than the fourth predetermined threshold value;

wherein, the first, second and third parameters satisfy a relation below:

the first parameter<the third parameter<the second parameter.

Wherein, the range of the second threshold value is as described above, the third threshold value may be selected as a numerical value according to an actual situation from a range greater than 100, and the fourth threshold value is greater than the second threshold value, and may be selected as a numerical value according to an actual situation from a range of 50-100.

Wherein, the numerical value of the first, second and third parameters is not strictly limited, only when they satisfy the relation of the first parameter<the third parameter<the second parameter. For example, the first parameter may be selected as a numerical value according to an actual situation from a range of 10-50, the second parameter may be selected as a numerical value according to an actual situation from a range of 50-200, and the third parameter may be selected as a numerical value according to an actual situation from a range of 30-100.

In step 102, two-dimensional discrete cosine transform (2D-DCT) is performed on the original gray image of the first adjacent area of each of the edge pixels. Wherein, performing two-dimensional discrete cosine transform to an image belongs to the prior art. For example, in performing two-dimensional discrete cosine transform on the original gray image of the first adjacent area of an edge pixel in the present invention embodiment, following formulae (7) and (8) may be used for the transform:

$$D(u, v) = DCT[I(x, y)] = \quad (7)$$

$$a(u)a(v)\sum_{x=0}^{M-1}\sum_{y=0}^{N-1} I(x, y)\cos\left[\frac{(2x+1)u\pi}{2M}\right]\cos\left[\frac{(2y+1)v\pi}{2N}\right],$$

$$\begin{cases} a(0) = \sqrt{\frac{1}{N}} \\ a(u) = \sqrt{\frac{2}{N}} \quad u = 1, 2, \ldots, M \\ a(v) = \sqrt{\frac{2}{M}} \quad v = 1, 2, \ldots, N \end{cases} \quad (8)$$

where, D(u,v) denotes a two-dimensional discrete cosine transformed image data of a pixel (x,y) within the first adjacent area of an edge pixel in the original gray image, I(x, y) denotes a pixel value of the pixel (x,y), a(0), a(u) and a(v) are transform coefficients, x,u=0, 1, ... M−1, y,v=0, 1, ... N−1, M and N denoting numbers of pixels in a lengthwise direction and a widthwise direction of the first adjacent area, and both M and N being integers greater than 1, and preferably integers greater than or equal to 9.

With above formulae (7) and (8), the two-dimensional discrete cosine transformed image data of the first adjacent area of the edge pixel (x,y) are obtained.

In step 103, two-dimensional Wiener filtering is performed on the two-dimensional discrete cosine transformed image data according to the noise variance determined in step 101.

In this embodiment, an existing two-dimensional Wiener filtering method may be employed to perform two-dimensional Wiener filtering on the two-dimensional discrete cosine transformed image data.

For example, two-dimensional Wiener filtering may be carried by using following formulae (9)-(11):

$$\text{mean}(i, j) = \frac{\sum_{k,m \in M'N'} x(k, m)}{M'N'}, k, m \in M' \times N' \quad (9)$$

$$\text{var}(i, j) = \frac{1}{M'N'}\left(\sum_{k,m \in M'N'} (x(k, m) - \text{mean}(i, j))^2\right) \quad (10)$$

$$Wn(i, j) = \quad (11)$$

$$2DWN[x(i, j)] = \text{mean}(i, j) + \frac{\text{var}(i, j) - nv}{\text{var}(i, j)}(x(i, j) - \text{mean}(i, j))$$

where, mean(i,j) denotes a mean value of a pixel (i,j) within the first adjacent area, x(k,m) denotes a pixel value of a pixel (k,m), the pixel (k,m) being a pixel within the fourth adjacent area of the pixel (i,j), var(i,j) denotes a variance of the pixel (i,j), Wn(i,j) denotes the two-dimensional Wiener filtered image data of the pixel (i,j), nv denotes a noise variance, and M' and N' denote numbers of pixels in a lengthwise direction and a widthwise direction of the fourth adjacent area, both M' and N' being integers greater than 1.

The two-dimensional Wiener filtering performed on the two-dimensional discrete cosine transformed image data, i.e. the two-dimensional Wiener filtering in the DCT domain, may be performed by using following formula (12) on the basis of above formula (11):

$$Wn(u, v) = \quad (12)$$

$$2DWN[d(u, v)] = \text{mean}(u, v) + \frac{\text{var}(u, v) - nv}{\text{var}(u, v)}(d(u, v) - \text{mean}(u, v));$$

where, Wn(u,v) denotes a two-dimensional Wiener filtered image data of the image data corresponding to the pixel (i,j) in the DCT domain, and d(u,v) denotes the image data corresponding to the pixel (i,j) in the DCT domain.

Wherein, the noise variance nv has been determined in step 101, and two-dimensional Wiener transform is performed to the image data in the first adjacent area of the edge pixel (x,y) in the DCT domain according to the determined nv, so as to obtain a two-dimensional Wiener filtered image data.

In step 104, two-dimensional discrete cosine inverse transform is performed on the two-dimensional Wiener filtered image data, so as to obtain a filtered gray image of the first adjacent area of the edge pixel.

Wherein, the two-dimensional discrete cosine inverse transform may employ the prior art. For example, corresponding to formulae (7) and (8), following formulae (13) and (14) may be employed for performing the two-dimensional discrete cosine inverse transform:

$$I_D(x, y) = IDCT[D(u, v)] = \quad (13)$$

$$\sum_{u=0}^{M-1}\sum_{v=0}^{N-1} a(u)a(v)D(u, v)\cos\left[\frac{(2x+1)u\pi}{2M}\right]\cos\left[\frac{(2y+1)v\pi}{2N}\right]$$

$$\begin{cases} a(0) = \sqrt{\frac{1}{N}} \\ a(u) = \sqrt{\frac{2}{N}} \quad u = 1, 2, \ldots, M \\ a(v) = \sqrt{\frac{2}{M}} \quad v = 1, 2, \ldots, N \end{cases} \quad (14)$$

where, $I_D(x,y)$ denotes a filtered image value of the pixel (x,y) within the first adjacent area of the edge pixel, D(u,v) denotes a two-dimensional discrete cosine transformed image data of the pixel (x,y) within the first adjacent area of the edge pixel in the original gray image a(0), a(u) and a(v) are transform coefficients, x,u=0, 1, ... M−1, y,v=0, 1, ... N−1, M and N denoting numbers of pixels in a lengthwise direction and a widthwise direction of the first adjacent area, and both M and N being integers greater than 1, and preferably integers greater than or equal to 9.

In this way, filtered pixel values of all the pixels of the first adjacent area of an edge pixel are obtained, thereby obtaining a filtered gray image of the first adjacent area of the edge pixel.

In step 105, a filtered pixel value of an edge pixel is extracted from a filtered gray image of the first adjacent area of the edge pixel, and weighted summation is performed on the filtered pixel value of the edge pixel and an original pixel value of the edge pixel, so as to obtain a processed pixel value of the edge pixel. The above step is repeated for each edge pixel, so as to obtain a processed pixel value of each of the edge pixels, thereby obtaining a processed gray image.

Wherein, the weighted summation is performed by using formula (15) below:

$$\text{ProImg} = a*\text{DCT-WN} + (1-a)*\text{OriImg} \quad (15)$$

where, ProImg denotes a processed pixel value of an edge pixel, DCT-WN denotes a filtered pixel value of the edge pixel, OriImg denotes an original pixel value of the edge pixel, and a is a predetermined weighting coefficient, $0<a\leq 1$, which may be determined according to an actual situation.

It can be seen from the above embodiment that the noise variance is determined according to the mean value and the standard difference of an edge pixel, and two-dimensional Wiener filtering is performed based on the noise variance in a 2D-DCT domain, so that edges of an image are made more natural, and line edges of an image are made more straight.

Embodiment 2

Figure 3:
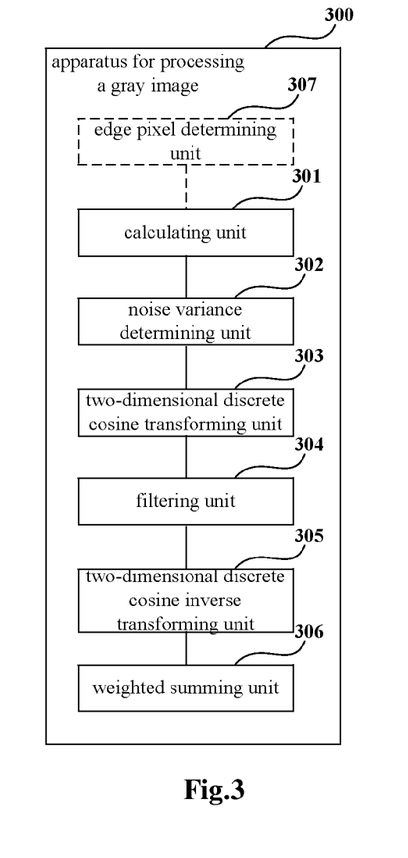
FIG. 3 is a schematic diagram of the structure of the apparatus for processing a gray image of Embodiment 2 of the present invention.

FIG. 3 is a schematic diagram of the structure of the apparatus 300 for processing a gray image of Embodiment 2 of the present invention, corresponding to the method for processing a gray image of Embodiment 1. As shown in FIG. 3, the apparatus 300 includes: a calculating unit 301, a noise variance determining unit 302, a two-dimensional discrete cosine transforming unit 303, a filtering unit 304, a two-dimensional discrete cosine inverse transforming unit 305 and a weighted summing unit 306. Wherein, calculating unit 301 is configured to calculate a mean value and a standard difference of each of edge pixels needing to be processed in an original gray image;

noise variance determining unit 302 is configured to determine a predefined noise variance of each of the edge pixels according to the mean value and the standard difference;

two-dimensional discrete cosine transforming unit 303 is configured to perform two-dimensional discrete cosine transform on an original gray image of a first adjacent area of each of the edge pixels;

filtering unit 304 is configured to perform two-dimensional Wiener filtering on the two-dimensional discrete cosine transformed image data according to the noise variance;

two-dimensional discrete cosine inverse transforming unit 305 is configured to perform two-dimensional discrete cosine inverse transform on the two-dimensional Wiener filtered image data, so as to obtain a filtered gray image of the first adjacent area;

and weighted summing unit 306 is configured to extract a filtered pixel value of each of the edge pixels from the filtered gray image of the first adjacent area, and perform weighted summation on the filtered pixel value of each of the edge pixels and an original pixel value of the edge pixel so as to obtain a processed pixel value of each of the edge pixels.

In this embodiment, apparatus 300 for processing a gray image may further includes:

an edge pixel determining unit 307 configured to determine the edge pixels needing to be processed.

In this embodiment, edge pixel determining unit 307 is optional, which is indicated with dashed lines in FIG. 3.

Figure 4:
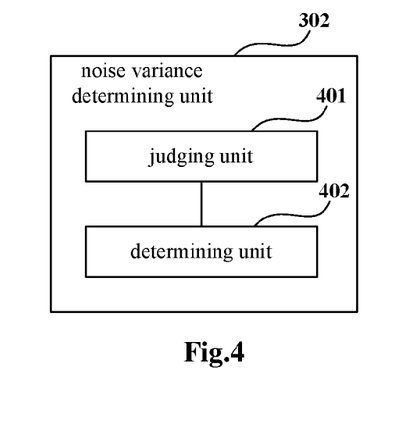
FIG. 4 is a schematic diagram of the structure of the noise variance determining unit of Embodiment 2 of the present invention.

In this embodiment, noise variance determining unit 302 is configured to determine a predefined noise variance of each of the edge pixels according to the mean value and the standard difference. FIG. 4 is a schematic diagram of the structure of noise variance determining unit 302 of this embodiment. However, the embodiments of the present invention are not limited to such a structure. As shown in FIG. 4, noise variance determining unit 302 includes a judging unit 401 and a determining unit 402, and wherein, judging unit 401 is configured to judge whether the standard difference is greater than a second predetermined threshold value and the mean value is greater than a third predetermined threshold value, or whether the standard difference is greater than the second predetermined threshold value and less than or equal to a fourth predetermined threshold value, or whether the standard difference is greater than the fourth predetermined threshold value;

and determining unit 402 is configured to set the noise variance as a first parameter when the standard difference is greater than the second predetermined threshold value and the mean value is greater than a third predetermined threshold value, set the noise variance as a second parameter when the standard difference is greater than the second predetermined threshold value and less than or equal to a fourth predetermined threshold value, and set the noise variance as a third parameter when the standard difference is greater than the fourth predetermined threshold value;

and wherein the first, second and third parameters satisfy a relation below:

the first parameter<the third parameter<the second parameter.

In this embodiment, the method for determining edge pixels needing to be processed, the method for calculating a mean value and a standard value of an edge pixel, the method for determining a noise variance according to the mean value and the standard value, the methods for performing the two-dimensional discrete cosine transform and inverse transform and performing two-dimensional Wiener filtering in the 2D-DCT domain and the method for performing weighted summation on the value of pixels are all identical to what is contained in Embodiment 1, which shall not be described herein any further.

It can be seen from the above embodiment that the noise variance is determined according to the mean value and the standard difference of an edge pixel, and two-dimensional Wiener filtering is performed based on the noise variance in a 2D-DCT domain, so that edges of an image are made more natural, and line edges of an image are made more straight.

Embodiment 3

Figure 5:
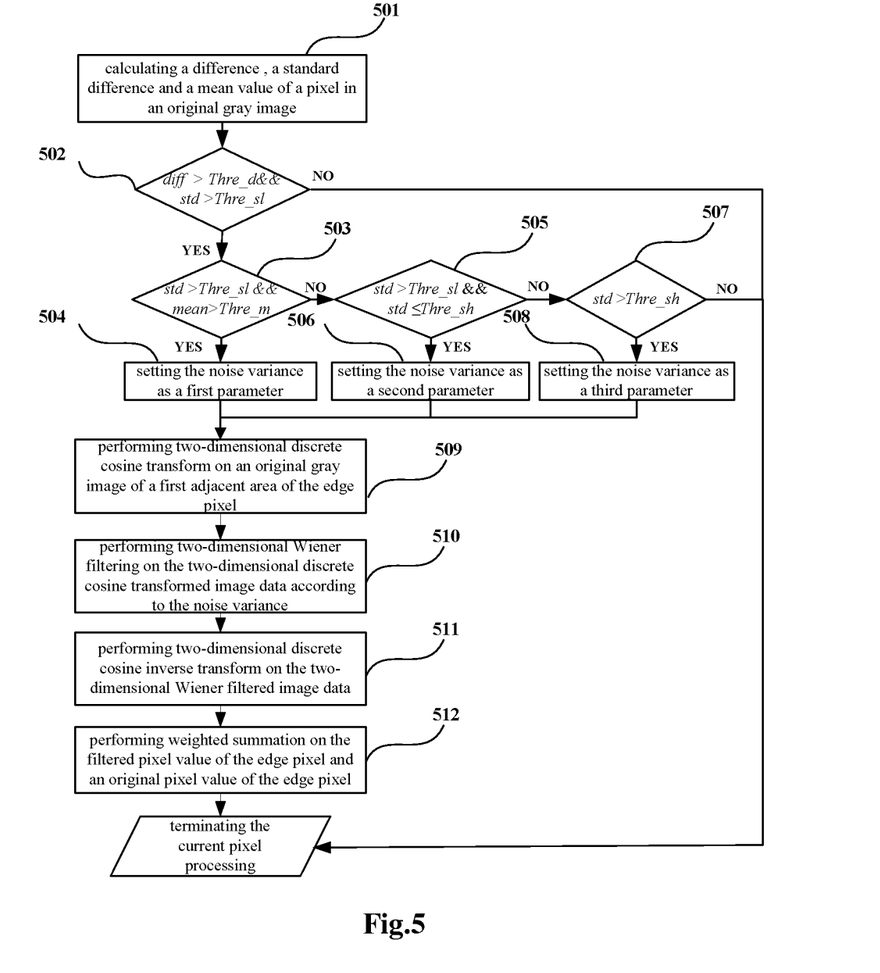
FIG. 5 is a flowchart of the method for processing a gray image of Embodiment 3 of the present invention.

FIG. 5 is a flowchart of the method for processing a gray image of Embodiment 3 of the present invention. As shown in FIG. 5, the method includes:

step 501: calculating a difference diff, a standard difference std and a mean value mean of a pixel in an original gray image;

wherein, the method for calculating the difference, the standard difference and the mean value is identical to what is contained in Embodiment 1, which shall not be described herein any further;

step 502: comparing the difference duff and the standard difference std of the pixel respectively with a first predefined threshold value Thre_d and a second predefined threshold value Thre_sl, determining that the pixel is an edge pixel needing to be processed, and entering into step 503 when the difference duff is greater than the first predefined threshold value Thre_d and the standard difference std is greater than the second predefined threshold value Thre_sl; otherwise, terminating the current pixel processing;

wherein, the method for setting the first threshold value and the second threshold value is identical to what is contained in Embodiment 1, which shall not be described herein any further;

step 503: comparing the standard difference and the mean value of the edge pixel respectively with the second predefined threshold value Thre_sl and a third predefined threshold value Thre_m, and entering into step 504 when the standard difference is greater than the second predefined threshold value and the mean value is greater than the third threshold value; otherwise, entering into step 505;

wherein, the method for setting the third threshold value is identical to what is contained in Embodiment 1, which shall not be described herein any further;

step 504: setting the noise variance as a first parameter, and entering into step 509;

step 505: comparing the standard difference of the pixel respectively with the second predefined threshold value and a fourth predefined threshold value, and entering into step 506 when the standard difference is greater than the second predefined threshold value Thre_sl and less than or equal to the fourth threshold value Thre_sh; otherwise, entering into step 507;

wherein, the method for setting the fourth threshold value is identical to what is contained in Embodiment 1, which shall not be described herein any further;

step 506: setting the noise variance as a second parameter, and entering into step 509;

step 507: entering into step 508 when the standard difference of the edge pixel is greater than the fourth predefined threshold value; otherwise, terminating the current pixel processing;

step 508: setting the noise variance as a third parameter, and entering into step 509;

wherein the first, second and third parameters in steps 504, 506 and 508 satisfy a relation below:

the first parameter<the third parameter<the second parameter;

wherein, the method for setting the first, second and third parameters is identical to what is contained in Embodiment 1, which shall not be described herein any further;

step 509: performing two-dimensional discrete cosine transform on an original gray image of a first adjacent area of the edge pixel;

wherein, the method for performing two-dimensional discrete cosine transform is identical to what is contained in Embodiment 1, which shall not be described herein any further;

step 510: performing two-dimensional Wiener filtering on the two-dimensional discrete cosine transformed image data according to the noise variance;

wherein, the method for performing two-dimensional Wiener filtering in the DCT domain is identical to what is contained in Embodiment 1, which shall not be described herein any further;

step 511: performing two-dimensional discrete cosine inverse transform on the two-dimensional Wiener filtered image data, so as to obtain a filtered gray image of the first adjacent area of the edge pixel;

wherein, the method for performing two-dimensional discrete cosine inverse transform is identical to what is contained in Embodiment 1, which shall not be described herein any further;

step 512: extracting a filtered pixel value of the edge pixel from the filtered gray image of the first adjacent area of the edge pixel, and performing weighted summation on the filtered pixel value of the edge pixel and an original pixel value of the edge pixel so as to obtain a processed pixel value of the edge pixel;

wherein, the method for performing weighted summation is identical to what is contained in Embodiment 1, which shall not be described herein any further above steps 501-512 are repeated, so as to obtain processed pixel values of all the edge pixels needing to be processed, thereby obtaining a processed gray image.

It can be seen from the above embodiment that the noise variance is determined according to the mean value and the standard difference of an edge pixel, and two-dimensional Wiener filtering is performed based on the noise variance in a 2D-DCT domain, so that edges of an image are made more natural, and line edges of an image are made more straight.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above.

The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

Supplements

Supplement 1. A method for processing a gray image, including:

calculating a mean value and a standard difference of each of edge pixels needing to be processed in an original gray image, and determining a predefined noise variance of each of the edge pixels according to the mean value and the standard difference;

performing two-dimensional discrete cosine transform on an original gray image of a first adjacent area of each of the edge pixels;

performing two-dimensional Wiener filtering on the two-dimensional discrete cosine transformed image data according to the noise variance;

performing two-dimensional discrete cosine inverse transform on the two-dimensional Wiener filtered image data, so as to obtain a filtered gray image of the first adjacent area; and extracting a filtered pixel value of each of the edge pixels from the filtered gray image of the first adjacent area, and performing weighted summation on the filtered pixel value of each of the edge pixels and an original pixel value of the edge pixel so as to obtain a processed pixel value of each of the edge pixels.

Supplement 2. The method according to supplement 1, wherein the method further includes: determining the edge pixels needing to be processed;

and wherein the determining the edge pixels needing to be processed includes: taking pixels in pixels of an original gray image with a difference greater than a first predetermined threshold value and a standard difference greater than a second predetermined threshold value as the edge pixels needing to be processed.

Supplement 3. The method according to supplement 2, wherein, the difference of the pixels is calculated by using formula (1) below:

$$\text{diff}(i,j)=\max(|x(i,j)-x(k,m)|), k \in [i-Rd, i+Rd], m \in [j-Rd, j+Rd] \quad (1)$$

where, diff(i,j) denotes a difference of a pixel (i,j), x(i,j) denotes a pixel value of the pixel (i,j) x(k,m) denotes a pixel value of a pixel (k,m), the pixel (k,m) being a pixel of a second adjacent area of the pixel (i,j), Rd denotes a radius of the second adjacent area, i and k are integers from 1 to A, and j and m are integers from 1 to B, A and B being a number of rows and a number of columns of the pixels of the original gray image, respectively.

Supplement 4. The method according to supplement 1, wherein the determining a predefined noise variance according to the mean value and the standard difference includes:

setting the noise variance as a first parameter when the standard difference is greater than a second predetermined threshold value and the mean value is greater than a third predetermined threshold value;

setting the noise variance as a second parameter when the standard difference is greater than the second predetermined threshold value and less than or equal to a fourth predetermined threshold value; and setting the noise variance as a third parameter when the standard difference is greater than the fourth predetermined threshold value;

and wherein the first, second and third parameters satisfy a relation below:

the first parameter<the third parameter<the second parameter.

Supplement 5. The method according to supplement 1, wherein the performing weighted summation on the filtered pixel value of each of the edge pixels and an original pixel value of the edge pixel so as to obtain a processed pixel value of each of the edge pixels includes:

performing the weighted summation by using formula (2) below:

$$ProImg = a*DCT\text{-}WN + (1-a)*OriImg \quad (2)$$

where, ProImg denotes a processed pixel value of the edge pixel, DCT-WN denotes a filtered pixel value of the edge pixel, OriImg denotes an original pixel value of the edge pixel, and a is a predetermined weighting coefficient, $0 < a \leq 1$.

Supplement 6. The method according to any one of supplements 1-5, wherein the first adjacent area is an area with a size M×N around each of the edge pixels, M denoting a number of pixels in a height direction of the first adjacent area, N denoting a number of pixels in a widthwise direction of the first adjacent area, and both M and N being integers greater than or equal to 9.

Supplement 7. An apparatus for processing a gray image, including:

a calculating unit configured to calculate a mean value and a standard difference of each of edge pixels needing to be processed in an original gray image;

a noise variance determining unit configured to determine a predefined noise variance of each of the edge pixels according to the mean value and the standard difference;

a two-dimensional discrete cosine transforming unit configured to perform two-dimensional discrete cosine transform on an original gray image of a first adjacent area of each of the edge pixels;

a filtering unit configured to perform two-dimensional Wiener filtering on the two-dimensional discrete cosine transformed image data according to the noise variance;

a two-dimensional discrete cosine inverse transforming unit configured to perform two-dimensional discrete cosine inverse transform on the two-dimensional Wiener filtered image data, so as to obtain a filtered gray image of the first adjacent area; and a weighted summing unit configured to extract a filtered pixel value of each of the edge pixels from the filtered gray image of the first adjacent area, and perform weighted summation on the filtered pixel value of each of the edge pixels and an original pixel value of the edge pixel so as to obtain a processed pixel value of each of the edge pixels.

Supplement 8. The apparatus according to Supplement 7, wherein the apparatus further includes:

an edge pixel determining unit configured to determine the edge pixels needing to be processed;

and wherein the edge pixel determining unit takes pixels in pixels of an original gray image with a difference greater than a first predetermined threshold value and a standard difference greater than a second predetermined threshold value as the edge pixels needing to be processed.

Supplement 9. The apparatus according to supplement 8, wherein, the calculating unit uses formula (1) below to calculate the difference of the pixel:

$$\text{diff}(i,j) = \max(|x(i,j) - x(k,m)|), k \in [i-Rd, i+Rd], m \in [j-Rd, j+Rd] \quad (1)$$

where, diff (i,j) denotes a difference of a pixel (i,j) x(i,j) denotes a pixel value of the pixel (i,j), x(k,m) denotes a pixel value of a pixel (k,m), the pixel (k,m) being a pixel of a second adjacent area of the pixel (i,j), Rd denotes a radius of the second adjacent area, i and k are integers from 1 to A, and j and m are integers from 1 to B, A and B being a number of rows and a number of columns of the pixels of the original gray image, respectively.

Supplement 10. The apparatus according to supplement 7, wherein the noise variance determining unit includes a judging unit and a determining unit, and wherein, the judging unit is configured to judge whether the standard difference is greater than a second predetermined threshold value and the mean value is greater than a third predetermined threshold value, or whether the standard difference is greater than the second predetermined threshold value and less than or equal to a fourth predetermined threshold value, or whether the standard difference is greater than the fourth predetermined threshold value;

and the determining unit is configured to set the noise variance as a first parameter when the standard difference is greater than the second predetermined threshold value and the mean value is greater than a third predetermined threshold value, set the noise variance as a second parameter when the standard difference is greater than the second predetermined threshold value and less than or equal to a fourth predetermined threshold value, and set the noise variance as a third parameter when the standard difference is greater than the fourth predetermined threshold value;

and wherein the first, second and third parameters satisfy a relation below:

the first parameter<the third parameter<the second parameter.

Supplement 11. The apparatus according to supplement 7, wherein the weighted summing unit performs the weighted summation by using formula (2) below:

$$ProImg = a*DCT\text{-}WN + (1-a)*OriImg \quad (2)$$

where, ProImg denotes a processed pixel value of the edge pixel, DCT-WN denotes a filtered pixel value of the edge pixel, OriImg denotes an original pixel value of the edge pixel, and a is a predetermined weighting coefficient, $0 < a \leq 1$.

Supplement 12. The apparatus according to any one of supplements 7-11, wherein the first adjacent area is an area with a size M×N around each of the edge pixels, M denoting a number of pixels in a height direction of the first adjacent area, N denoting a number of pixels in a widthwise direction of the first adjacent area, and both M and N being integers greater than or equal to 9.

The invention claimed is:

1. A method for processing edges of a gray image, comprising:

calculating a mean value and a standard difference of each of edge pixels needing to be processed in an original gray image, and determining a predefined noise variance of each of the edge pixels according to the mean value and the standard difference;

performing two-dimensional discrete cosine transform on an original gray image of a first adjacent area of each of the edge pixels;

performing two-dimensional Wiener filtering on the two-dimensional discrete cosine transformed image data according to the noise variance;

performing two-dimensional discrete cosine inverse transform on the two-dimensional Wiener filtered image data, so as to obtain a filtered gray image of the first adjacent area; and extracting a filtered pixel value of each of the edge pixels from the filtered gray image of the first adjacent area, and performing weighted summation on the filtered pixel value of each of the edge pixels and an original pixel value of the edge pixel so as to obtain a processed pixel value of each of the edge pixels.

2. The method according to claim 1, wherein the method further comprises: determining the edge pixels needing to be processed;

and wherein the determining the edge pixels needing to be processed comprises: taking pixels of an original gray image with a pixel difference greater than a first predetermined threshold value and a standard difference greater than a second predetermined threshold value as the edge pixels needing to be processed.

3. The method according to claim 2, wherein, the difference of the pixels is calculated by using formula (1) below:

$$\text{diff}(i,j) = \max(|x(i,j) - x(k,m)|), k \in [i-Rd, i+Rd], m \in [j-Rd, j+Rd] \quad (1)$$

where, diff (i,j) denotes a difference of a pixel (i,j), x(i,j) denotes a pixel value of the pixel (i,j), x(k,m) denotes a pixel value of a pixel (k,m), the pixel (k,m) being a pixel of a second adjacent area of the pixel (i,j), Rd denotes a radius of the second adjacent area, i and k are integers from 1 to A, and j and m are integers from 1 to B, A and B being a number of rows and a number of columns of the pixels of the original gray image, respectively.

4. The method according to claim 1, wherein the determining a predefined noise variance according to the mean value and the standard difference comprises:

setting the noise variance as a first parameter when the standard difference is greater than a second predetermined threshold value and the mean value is greater than a third predetermined threshold value;

setting the noise variance as a second parameter when the standard difference is greater than the second predetermined threshold value and less than or equal to a fourth predetermined threshold value; and setting the noise variance as a third parameter when the standard difference is greater than the fourth predetermined threshold value;

and wherein the first, second and third parameters satisfy a relation below:

the first parameter<the third parameter<the second parameter.

5. The method according to claim 1, wherein the performing weighted summation on the filtered pixel value of each of the edge pixels and an original pixel value of the edge pixel so as to obtain a processed pixel value of each of the edge pixels comprises:

performing the weighted summation by using formula (2) below:

$$\text{ProImg} = a*\text{DCT-WN} + (1-a)*\text{OriImg} \quad (2)$$

where, ProImg denotes a processed pixel value of the edge pixel, DCT-WN denotes a filtered pixel value of the edge pixel, OriImg denotes an original pixel value of the edge pixel, and a is a predetermined weighting coefficient, 0<a1.

6. The method according to claim 1, wherein the first adjacent area is an area with a size M×N around each of the edge pixels, M denoting a number of pixels in a height direction of the first adjacent area, N denoting a number of pixels in a widthwise direction of the first adjacent area, and both M and N being integers greater than or equal to 9.

7. An apparatus for processing edges of a gray image, comprising:

a calculating unit configured to calculate a mean value and a standard difference of each of edge pixels needing to be processed in an original gray image;

a noise variance determining unit configured to determine a predefined noise variance of each of the edge pixels according to the mean value and the standard difference;

a two-dimensional discrete cosine transforming unit configured to perform two-dimensional discrete cosine transform on an original gray image of a first adjacent area of each of the edge pixels;

a filtering unit configured to perform two-dimensional Wiener filtering on the two-dimensional discrete cosine transformed image data according to the noise variance;

a two-dimensional discrete cosine inverse transforming unit configured to perform two-dimensional discrete cosine inverse transform on the two-dimensional Wiener filtered image data, so as to obtain a filtered gray image of the first adjacent area; and a weighted summing unit configured to extract a filtered pixel value of each of the edge pixels from the filtered gray image of the first adjacent area, and perform weighted summation on the filtered pixel value of each of the edge pixels and an original pixel value of the edge pixel so as to obtain a processed pixel value of each of the edge pixels.

8. The apparatus according to claim 7, wherein the apparatus further comprises:

an edge pixel determining unit configured to determine the edge pixels needing to be processed;

and wherein the edge pixel determining unit takes pixels of an original gray image with a difference greater than a first predetermined threshold value and a standard difference greater than a second predetermined threshold value as the edge pixels needing to be processed.

9. The apparatus according to claim 8, wherein, the calculating unit uses formula (1) below to calculate the difference of the pixel:

$$\text{diff}(i,j) = \max(|x(i,j) - x(k,m)|), k \in [i-Rd, i+Rd], m \in [j-Rd, j+Rd] \quad (1)$$

where, diff (i,j) denotes a difference of a pixel (i,j), x(i,j) denotes a pixel value of the pixel (i,j), x(k,m) denotes a pixel value of a pixel (k,m), the pixel (k,m) being a pixel of a second adjacent area of the pixel (i,j), Rd denotes a radius of the second adjacent area, i and k are integers from 1 to A, and j and m are integers from 1 to B, A and B being a number of rows and a number of columns of the pixels of the original gray image, respectively.

10. The apparatus according to claim 7, wherein the noise variance determining unit comprises a judging unit and a determining unit, and wherein, the judging unit is configured to judge whether the standard difference is greater than a second predetermined threshold value and the mean value is greater than a third predetermined threshold value, or whether the standard difference is greater than the second predetermined threshold value and less than or equal to a fourth predetermined threshold value, or whether the standard difference is greater than the fourth predetermined threshold value;

and the determining unit is configured to set the noise variance as a first parameter when the standard difference is greater than the second predetermined threshold value and the mean value is greater than a third predetermined threshold value, set the noise variance as a second parameter when the standard difference is greater than the second predetermined threshold value and less than or equal to a fourth predetermined threshold value, and set the noise variance as a third parameter when the standard difference is greater than the fourth predetermined threshold value;

and wherein the first, second and third parameters satisfy a relation below:

the first parameter<the third parameter<the second parameter.

11. The apparatus according to claim 7, wherein the weighted summing unit performs the weighted summation by using formula (2) below:

$$ProImg = a*DCT\text{-}WN + (1-a)*OriImg \qquad (2)$$

where, ProImg denotes a processed pixel value of the edge pixel, DCT-WN denotes a filtered pixel value of the edge pixel, OriImg denotes an original pixel value of the edge pixel, and a is a predetermined weighting coefficient, $0 < a \leq 51$.

12. The apparatus according to claim 7, wherein the first adjacent area is an area with a size M×N around each of the edge pixels, M denoting a number of pixels in a height direction of the first adjacent area, N denoting a number of pixels in a widthwise direction of the first adjacent area, and both M and N being integers greater than or equal to 9.

* * * * *